(12) United States Patent
Goldberg

(10) Patent No.: US 12,457,448 B2
(45) Date of Patent: Oct. 28, 2025

(54) HEAD-WORN COMPUTING DEVICE WITH MICROPHONE BEAM STEERING

(71) Applicant: GOOGLE LLC, Mountain View, CA (US)

(72) Inventor: Steven Benjamin Goldberg, Los Altos Hills, CA (US)

(73) Assignee: GOOGLE LLC, Mountain View, CA (US)

( * ) Notice: Subject to any disclaimer, the term of this patent is extended or adjusted under 35 U.S.C. 154(b) by 156 days.

(21) Appl. No.: 18/255,231

(22) PCT Filed: Jan. 28, 2021

(86) PCT No.: PCT/US2021/070088
§ 371 (c)(1),
(2) Date: May 31, 2023

(87) PCT Pub. No.: WO2022/164572
PCT Pub. Date: Aug. 4, 2022

(65) Prior Publication Data
US 2024/0098409 A1    Mar. 21, 2024

(51) Int. Cl.
*H04R 3/00* (2006.01)
*H04R 25/00* (2006.01)

(52) U.S. Cl.
CPC .......... *H04R 3/005* (2013.01); *H04R 25/407* (2013.01); *H04R 2430/20* (2013.01)

(58) Field of Classification Search
CPC ... H04R 3/005; H04R 25/407; H04R 2430/20
(Continued)

(56) References Cited

U.S. PATENT DOCUMENTS 9,729,994 B1   8/2017   Eddins et al.
9,838,785 B2   12/2017  Sherman
(Continued)

FOREIGN PATENT DOCUMENTS

EP   2908549 A1    8/2015
JP   2009135594 A  6/2009
(Continued)

OTHER PUBLICATIONS

International Search Report and Written Opinion for PCT Application No. PCT/US2021/070088, mailed on Oct. 21, 2021, 20 pages.
(Continued)

*Primary Examiner* — Ammar T Hamid
(74) *Attorney, Agent, or Firm* — Brake Hughes Bellermann LP

(57) ABSTRACT

The disclosed devices and methods provide beamforming for a head-worn microphone array that can adapt to changes in the user's head position/orientation. The microphone array may be part of a head-worn computing device, which can be configured to automatically detect a direction for the beamforming based on computer-assisted recognition of a conversation with a participant. After the participant is identified, the beamforming can automatically steer the sensitivity of the microphone array towards the participant regardless of the position of the head user to improve a quality of the captured audio without constraining movement of a user. The improved audio may be used to aid in a user's hearing of the conversation, aid an augmented reality application corresponding to the conversation, and/or provide a degree of privacy by limiting sensitivity to participants in the conversation.

20 Claims, 6 Drawing Sheets

(58) Field of Classification Search
USPC .................................................. 381/92, 122
See application file for complete search history.

(56) References Cited

U.S. PATENT DOCUMENTS

| | | |
|---|---|---|
| 2012/0215519 A1 | 8/2012 | Park et al. |
| 2015/0341734 A1* | 11/2015 | Sherman ................ G06F 3/013 |
| | | 381/92 |
| 2017/0201808 A1* | 7/2017 | Chowdhary ......... G02B 27/017 |
| 2019/0028817 A1* | 1/2019 | Gabai .................. H04R 25/407 |
| 2020/0092644 A1 | 3/2020 | Alders et al. |
| 2020/0128322 A1 | 4/2020 | Sabin et al. |
| 2020/0296521 A1* | 9/2020 | Wexler ................... G06F 3/167 |

FOREIGN PATENT DOCUMENTS

| | | |
|---|---|---|
| JP | 2014192546 A | 10/2014 |
| JP | 2017521902 A | 8/2017 |

OTHER PUBLICATIONS

Veiback, et al., "Sound Source Localization and Reconstruction Using a Wearable Microphone Array and Inertial Sensors", 2020 IEEE 23rd International Conference on Information Fusion (Fusion), International Society of Information Fusion (ISIF), Jul. 6, 2020, pp. 1-8, XP033824753.

* cited by examiner

HEAD-WORN COMPUTING DEVICE WITH MICROPHONE BEAM STEERING

CROSS REFERENCE TO RELATED APPLICATION

This application is a 35 U.S.C. § 371 National Phase Entry Application from PCT/US2021/070088, filed Jan. 28, 2021, designating the U.S., the disclosure of which is incorporated herein by reference in its entirety.

FIELD OF THE DISCLOSURE

The present disclosure relates to acoustic beam steering and specifically, to steering a beam of a microphone array of a head-mounted computing device.

BACKGROUND

A head-mounted computing device may be configured to capture information from an environment and from a user. The captured information can be processed to determine relative orientations and positions of objects in the environment and the user so that virtual aspects may be generated and displayed. As a result, a user can perceive an environment including both real and virtual aspects that change as the user interacts with, or moves within, the environment. Accordingly, the head-mounted computing device may include a myriad of subsystems for capturing and displaying sensory information (e.g., auditory, visual) and for determining orientation and position (e.g., a head-pose). Opportunities may therefore exist for the head-mounted computing device to aid the user with conversations. This aid, however, could offer an opportunity to violate the privacy of others.

SUMMARY

In at least one aspect, the present disclosure generally describes a head-worn computing device. The head-worn computing device includes a microphone array that includes a plurality of microphones. The microphone array is configured to generate a beamformed audio signal based on sounds received by the plurality of microphones according to a beamformed sensitivity of the microphone array. The head-worn computing device further includes a plurality of loudspeakers that are configured to transmit sounds. The head-worn computing device further includes a plurality of sensors configured to measure an orientation of the head-worn computing device relative to a fixed frame of reference. The head-worn computing device further includes a processor coupled to the plurality of microphones, the plurality of loudspeakers, and the plurality of sensors. The processor of the head-worn computing device is configured by software instructions to perform a method. The method includes identifying an orientation of a frame of reference of the microphone array based on an orientation of the head-worn computing device. The method further includes computing a target direction relative to the orientation of the frame of reference. The method further includes directing the beamformed sensitivity of the microphone array in the target direction. The method further includes detecting a change in the orientation of the frame of reference to obtain, based on the detected change in the orientation of the head-worn computing device, an updated target direction relative to the frame of reference of the microphone array upon detecting a change in the orientation of the head-worn computing device. The method further includes redirecting the beamformed sensitivity of the microphone array in the updated target direction.

According to possible implementations of the head-worn computing device, the head-worn computing device may comprise one or more (e.g., all) of the following features (or any combination thereof).

In a possible implementation of the head-worn computing device, redirecting the beamformed sensitivity of the microphone array in the updated target direction includes reducing a sensitivity of the microphone array in directions other than the target direction.

In a possible implementation of the head-worn computing device, the processor is further configured to delay channels of audio from the microphone array relative to each other in order to direct and redirect the beamformed sensitivity of the microphone array.

In another possible implementation of the head-worn computing device, the plurality of microphones includes an omnidirectional microphone configured to generate unfocused audio based on sounds received according to an isotropic sensitivity of the omnidirectional microphone. In this possible implementation, the processor can be further configured to detect a speaker based on sounds received by the omnidirectional microphone and to redirect the beamformed sensitivity of the microphone array towards the speaker.

In another possible implementation of the head-worn computing device, the plurality of sensors includes a camera configured to capture video from a point of view of a user wearing the head-worn computing device, and the processor is further configured to identify a conversation between the user and a participant, and compute the target direction as towards the participant.

In another possible implementation of the head-worn computing device, the plurality of sensors includes an inertial measurement unit that is configured to measure the orientation of the head-worn computing device. The inertial measurement unit can be configured to track changes in an orientation of the microphone array. The processor can be configured to detect a change in the orientation of the frame of reference and obtain an updated target direction based on the tracked changes.

In another possible implementation, the head-worn computing device is configured to generate beamformed audio based on the beamformed sensitivity of the microphone array and to transmit the beamformed audio to the augmented reality application running on the head-worn computing device.

In another possible implementation of the head-worn computing device, the processor is configured to generate beamformed audio based on the beamformed sensitivity of the microphone array and to transmit the beamformed audio to the plurality of loudspeakers. In this possible implementation, the plurality of loudspeakers includes one or more hearing instruments configured to be worn in an ear, or ears, of a user. For example, the one or more hearing instruments configured to be worn in an ear, or ears, of a user can be configured to communicate wirelessly with the processor.

In another aspect, the present disclosure generally describes a method for generating beamformed audio based on a conversation layout. The method includes detecting a conversation between a user and a participant based on images or video captured by a camera of a head-worn computing device worn by the user. The method further includes determining a head-pose of the user based on measurements captured by sensors of the head-worn computing device worn by the user. The method further includes computing a conversation layout based on relative positions of the participant and the head-pose. The method further includes receiving channels of audio from a microphone array of the head-worn computing device and processing the channels of audio to generate beamformed audio based on the conversation layout. Alternatively, or additionally, the method for generating beamformed audio based on a conversation layout may comprise: identifying an orientation of a frame of reference of a microphone array based on an orientation of the head-worn computing device; computing a target direction relative to the orientation of the frame of reference; directing the beamformed sensitivity of the microphone array in the target direction; updating the frame of reference, upon detecting a change in the orientation of the head-worn computing device, to obtain an updated target direction; and redirecting the beamformed sensitivity of the microphone array in the updated target direction.

According to possible implementations of the method, the method may comprise one or more (e.g., all) of the following features (or any combination thereof).

In a possible implementation of the method, the beamformed audio corresponds to sounds received according to a beamformed sensitivity directed at the participant. In this implementation, the method may further include obtaining an updated conversation layout upon detecting a change in an orientation of the head-worn computing device using an inertial measurement unit and processing the channels of audio to redirect the beamformed sensitivity to the participant in the updated conversation layout.

In another possible implementation of the method, the method further includes presenting the beamformed audio to a user.

In another possible implementation of the method, the method further includes reducing a sensitivity of the beamformed audio in a direction towards a bystander.

In another possible implementation of the method, further includes presenting augmented reality visuals on a display of the head-worn computing device, where the augmented reality visuals correspond to the beamformed audio. For example, the augmented reality visuals can be closed captions of the conversation.

In another aspect, the present disclosure generally describes a computer program product tangibly embodied on a non-transitory computer-readable medium and comprising instructions that, when executed, are configured to cause at least one processor of a head-worn computing device to perform a method. The method includes identifying a frame of reference of the microphone array based on an orientation of the head-worn computing device. The method further includes computing a target direction relative to the frame of reference. The method further includes directing a beamformed sensitivity of the microphone array in a direction towards the target direction. The method further includes updating the frame of reference to obtain an updated target direction upon detecting a change in the orientation of the head-worn computing device. The method further includes redirecting the beamformed sensitivity of the microphone array towards the updated target direction to provide bystander privacy.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The components in the drawings are not necessarily to scale relative to each other. Like reference numerals designate corresponding parts throughout the several views.

DETAILED DESCRIPTION

Beamforming is a technique for increasing a receiving sensitivity of a microphone array in a particular direction (or directions), as compared with other directions. Beamforming may be used to steer the sensitivity of a head-worn microphone array towards a sound source to improve a quality of the audio from the sound source. A problem of misalignment of the steered sensitivity may occur, however, when a head position/orientation (i.e., head-pose) of a user wearing the head-worn microphone array is changed. Accordingly, the disclosed devices and methods provide an adaptive beamforming technique for a head-worn microphone array that can adapt to (i.e., is tolerant of) changes in the user's head position/orientation. The disclosed solution may have the technical effect of improving a quality of the audio captured by the head-worn microphone array while providing a user more freedom of movement. Adaptive beamforming may also have the technical effect of providing a layer of privacy. For example, beamforming can maintain the focus of the microphone array on a specific person in conversation with the user and prevent the amplification of audio received from bystanders. A problem associated with adaptive beamforming is its processing requirements. The disclosed devices and methods provide a means for reducing the processing requirements of adaptive beamforming.

Figure 1B:
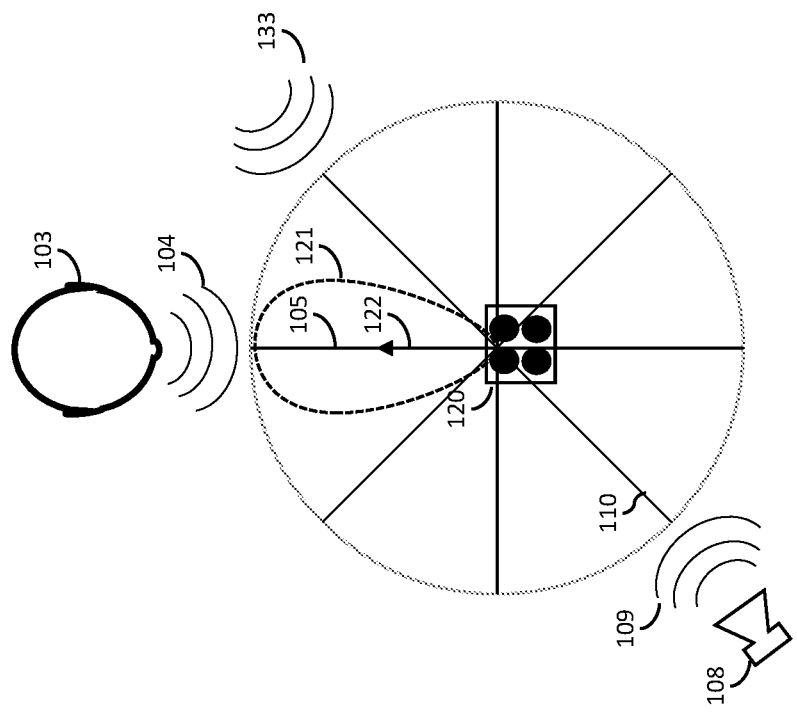
FIG. 1B is an example polar plot of a sensitivity of a microphone array having a beam steered to a sound source in the acoustic environment of FIG. 1A.
Figure 1A:
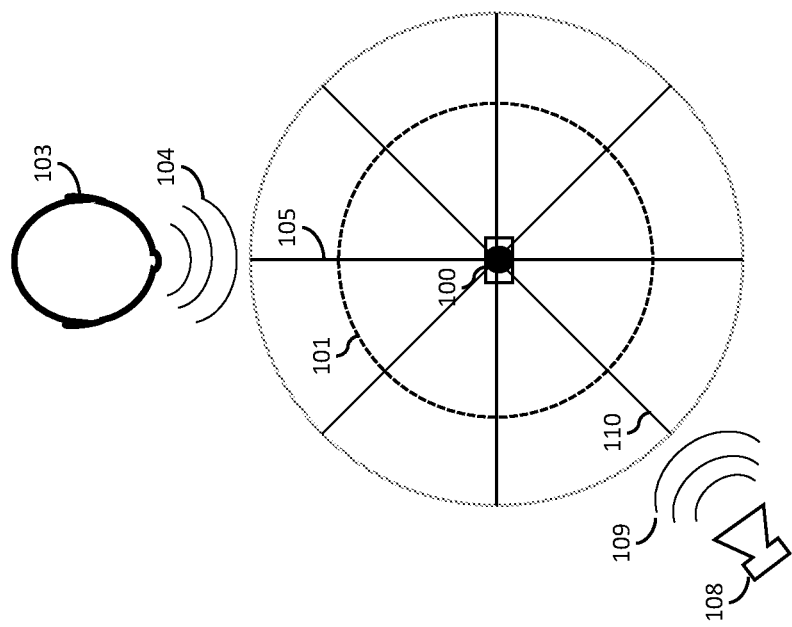
FIG. 1A is an example polar plot of a sensitivity of an omnidirectional microphone in an acoustic environment.

FIG. 1A is an example polar plot of a sensitivity of an omnidirectional microphone 100 in an acoustic environment. The omnidirectional microphone 100 has a sensitivity pattern (i.e., sensitivity 101) that does not change with angle (i.e., is isotropic). Accordingly, the omnidirectional microphone 100 will receive speech-audio 104 from a speech-source 103 (e.g., person) along a speech-direction 105 with a sensitivity 101 that substantially matches a sensitivity 101 with which the omnidirectional microphone 100 receives noise-audio 109 from a noise-source 108 (e.g., machinery)

along a noise-direction 110. In some applications (e.g., in hearing instruments, such as headphones, earphones, or hearing aids), it may be desirable to reduce the microphone's sensitivity in the noise-direction 110 and/or to enhance the microphone's sensitivity in the speech-direction 105 so that the speech-audio 104 can be amplified preferentially over the noise-audio 109 to a user of the microphone.

Beamforming (i.e., beam steering) is a signal processing in which multiple channels of audio can be processed (e.g., filtered, delayed, phase shifted) to generate a beamformed audio signal in which audio from different directions may be enhanced or diminished. For example, a first microphone and a second microphone can be spatially separated by a distance along an array direction. The spatial separation distance and the direction of the sound (relative to the array direction) can introduce an interaural delay between a first audio stream at the first microphone and a second audio stream at the second microphone. Beamforming can include further delaying one of the audio streams by a beamforming delay so that after the beamforming the first audio stream and the second audio stream are phase shifted by the interaural delay and the beamforming delay. The phase shifted audio streams are then combined (e.g., summed) to produce beamformed audio. By adjusting the beamforming delay with respect to the interaural delay, audio from a particular direction may be adjusted (e.g., cancelled, attenuated, enhanced) by the summing process. For example, a pure sine wave received by the first microphone and the second microphone can be canceled completely for a particular direction if, after the interaural delay and the beamforming delay, the versions of the sine wave at the combiner are 180 degrees out of phase. Alternatively, the versions of the sine wave at the combiner can be enhanced if after the interaural delay and the beamforming delay, the versions of the sine wave at the combiner are in phase (i.e., 0 degrees out of phase).

The multiple channels of audio can be captured (i.e., collected) by an array of microphones (i.e., microphone array). Each microphone in the microphone array can be of the same type or the types of different microphones in the array can be different. The microphone array may include a plurality of microphones spaced apart (e.g., equally spaced) in one, two, or three dimensions. For example, each microphone in the microphone array can be omnidirectional; however, due to beamforming, the microphone array can have a beamformed sensitivity that is directional (i.e., that has a beam for receiving). Accordingly, steering a beamformed sensitivity may be understood as steering (i.e., repositioning) a beam of preferential sensitivity of the microphone array.

FIG. 1B is an example polar plot of a beamformed sensitivity of a microphone array 120. In particular, each microphone in the microphone array 120 may generate an audio channel. The different audio channels may be processed (e.g., phase shifted relative to each other and summed) to produce a beamformed audio channel with a beamformed sensitivity that is not isotropic. In other words, a microphone array 120 may focus a beam 121 in a beam-direction 122 that can be steered to align with the speech-direction 105 by the beamforming processing. The number and spacing of microphones in a microphone array 120 can correspond to a directivity (i.e., focus, angular extent) of the beam 121. As shown in FIG. 1B, the increased directivity created by the microphone array can result in beamformed audio which includes speech-audio 104 that has a higher amplitude than the noise-audio 109. Accordingly, beamforming may help a user to distinguish the speech-audio 104 (e.g., in a noisy environment). Additionally (or alternatively), beamforming may improve an accuracy of other computer-aided speech applications (e.g., voice recognition, voice-to-text (VTT), language translation, etc.). Additionally, the beamforming may increase privacy because other-audio 133 (e.g., bystander conversation) received from a direction other than the speech-direction can be amplified much less than the speech-audio 104.

A head-worn computing device may include a variety of sensing and computing resources to enable a variety of technologies. For example, a head-worn computing device may be configured to provide augmented-reality (AR). In AR, sensors in the head-worn computing device can be configured to capture sensory data from an environment and from a user wearing the head-worn computing device. Based on this sensory data, virtual elements may be generated to enhance (i.e., augment) the user's perceptual experience. For example, a generation of a sound (e.g., tone, music, speech, etc.) and/or a display of a visual (e.g., graphic, text, color, etc.) can add information to the user's perceived environment when the virtual element is merged (e.g., overlaid) with the real environment.

The present disclosure describes a head-mounted computing device configured to enhance the user's natural perception of the real environment. This enhancement may or may not include the virtual aspects of AR. For example, the head-mounted computing device may be configured to beamform captured audio in order to aid a user's hearing in a direction associated with a conversation or to record sounds from a direction associated with a conversation. Additionally (or alternatively), the head-mounted computing device may be further configured to beamform the captured audio to help (e.g., improve an accuracy) of an AR application, such as closed captioning (i.e., subtitling) a conversation in real time.

The head-mounted computing device may be further configured to beamform the captured audio in order to help prevent the user from eavesdropping (e.g., listening to, recording) conversations in directions other than associated with the conversation. To achieve this privacy the head-mounted computing device can be configured to detect conversations to determine a participant (or participants) in conversation with the user. This detection may require a computationally expensive process that includes, for example, running computer vision algorithms on images captured from a camera (or cameras) of the head-worn computing device. This computationally expensive process may exceed a processing and/or a power budget of the head-worn computing device if they run continuously at a rate sufficient to respond to a user's head movement. Accordingly, the disclosed devices and methods can hand off beam steering to a less computationally expensive process after a conversation (or conversations) are determined. The less computationally expensive process my include determining a head movement change from an initial position using a position/orientation sensor (or sensors) and then updating positions of participants relative to the head movement change. The beam forming can then adjust the beam steering in response to the head movement to maintain a focus on the participant (or participants). Because this approach can require less processing and/or power, it may be run at a rate sufficiently high to respond to a head movement of a user.

Figure 2:
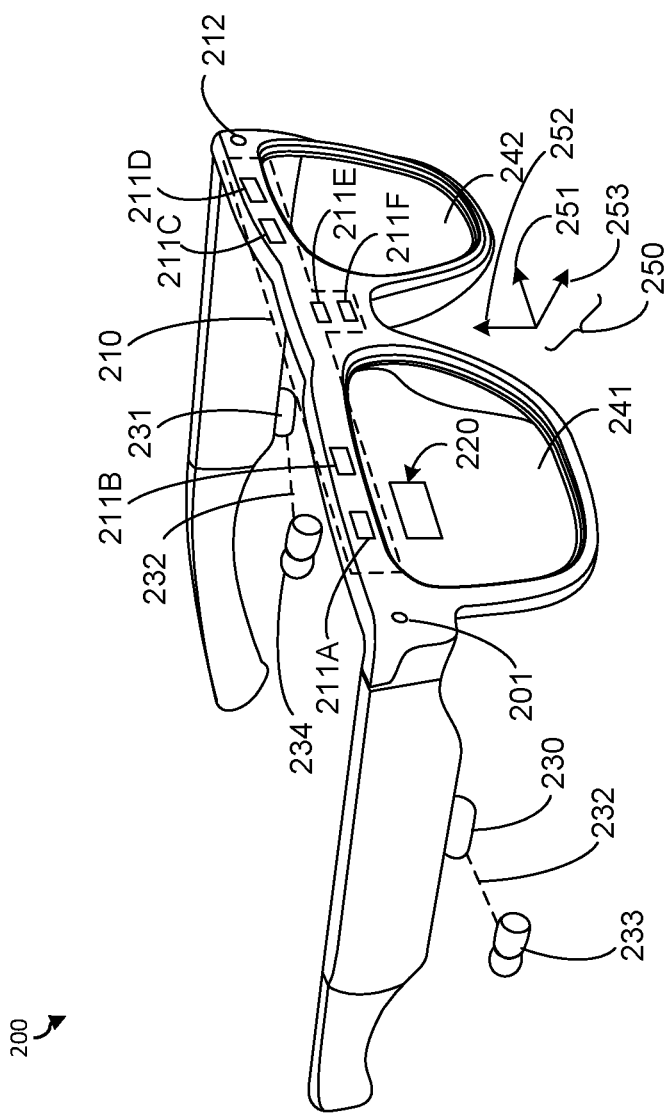
FIG. 2 is a perspective view of a head-worn computing device configured to generate beamformed audio according to a possible implementation of the present disclosure.

FIG. 2 is a perspective view of a head-worn computing device configured to generate beamformed audio according to a possible implementation of the present disclosure. As shown, the head-worn computing device may be implemented as smart glasses. Herein, "smart glasses" will be discussed and referred to interchangeably with the term "head-worn computing device" for the purpose of explaining the disclosure. However, the techniques presented herein may be applied more generally to any head-worn computing device that includes a microphone array (or arrays) that can be focused (i.e., steered) according to a head movement (e.g., to enable some change to the functioning of the head-worn computing device). For example, it is envisioned that the disclosure may be implemented as a virtual-reality (VR) headset or smart earbuds.

The head-worn computing device 200, shown in FIG. 2, is configured to be worn on the head/face of a user. The head-worn computing device 200 can be configured with a variety of sensors and a variety of interfaces. Additionally, the head-worn computing device may include a power source (e.g., battery) to enable portable operation, a memory to store data and computer readable instructions, one or more cameras 201 (e.g., a camera) to capture video/images/depth-information, and a projector/display to present visuals to a user in a display area 220 of a lens (or lenses). Accordingly, the head-worn computing device 200 can be configured for AR, as described previously and can present augmented reality visuals to the user in the display area 220. In one implementation, the augmented reality visuals can include closed captions of the conversation. Additionally, the head-worn computing device 200 can include subsystems and circuitry that can preferentially capture audio from a direction (or directions) that can change (e.g., automatically) with a movement of the head. This preference in capture direction (or directions) may help to improve a user's hearing, improve the functioning of an application, and/or provide a layer of privacy for bystanders not in conversation with the user.

The head-worn computing device 200 may further include a plurality of microphones 211A-F that can be operated together as a microphone array 210. The microphones in the microphone array 210 can be configured to capture audio from the environment of the user. For example, the microphones may be directed to a field of view of the user when the user is wearing the head-worn computing device. The microphones in the microphone array 210 may be spaced variously. In a possible implementation, one or more microphones (211A, 211B) may form a right channel, while one or more microphones (211C, 211D) may form a left channel. Microphones in the right channel and microphones in the left channel may be spaced apart to simulate a natural binaural spacing. For example, the left channel microphones (211C, 211D) may be positioned proximate to a left lens 242 of the head-worn computing device, while the right channel microphones (211A, 211B) may be positioned proximate to a right lens 241 of the head-worn computing device. In another possible implementation, the layout of the microphones may help beamform in a direction (e.g., cardinal direction) of a frame of reference 250 of the head-worn computing device 200. The frame of reference 250 of the head-worn computing device 200 is not fixed in space but rather has an orientation that tracks the orientation of the head-worn computing device 200 as the head-worn computing device 200 moves in space. The frame of reference 250 may be defined by three orthogonal axes: a first axis 251 that may be, for example, parallel to a horizontal direction of the device, a second axis 252 that may be, for example, parallel to a vertical direction of the device, and a third axis 253 that is orthogonal to the first and second axes. As shown in FIG. 2, a first array of microphones (211A, 211B, 211C, 211D) may be aligned parallel to the first axis 251 of the frame of reference 250 of the head-worn computing device 200. Beamforming algorithms applied to the first array of microphones may steer the beam in response to a left/right (i.e., yaw) movement of a user's head. A second array of microphones (211E, 211F) may be aligned parallel to the second axis 252 of the frame of reference 250 of the head-worn computing device 200. Beamforming algorithms applied to the second array of microphones may steer the beam in response to an up/down (i.e., pitch) movement of a user's head. In general, there may be arrays of microphones aligned with any number of directions. Beamforming may include combining different microphone arrays to accommodate beam steering in a plurality of directions.

Figure 3C:
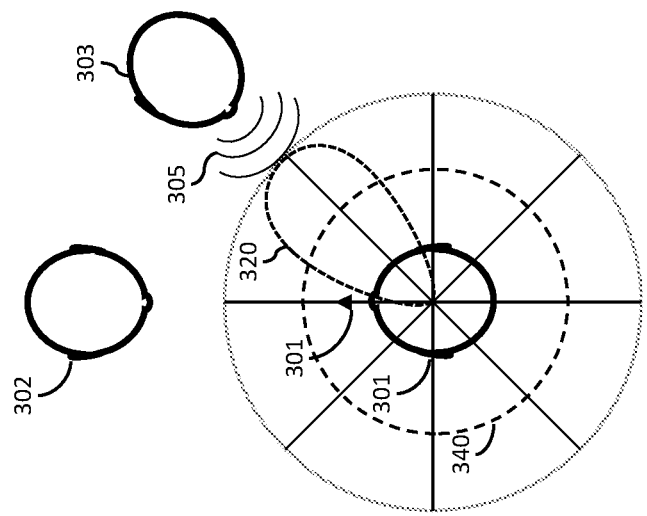
FIG. 3C is a possible polar plot of a sensitivity of a head-worn microphone array having a beam steered in a third direction when a new speaker is detected by an ambient microphone.
Figure 3B:
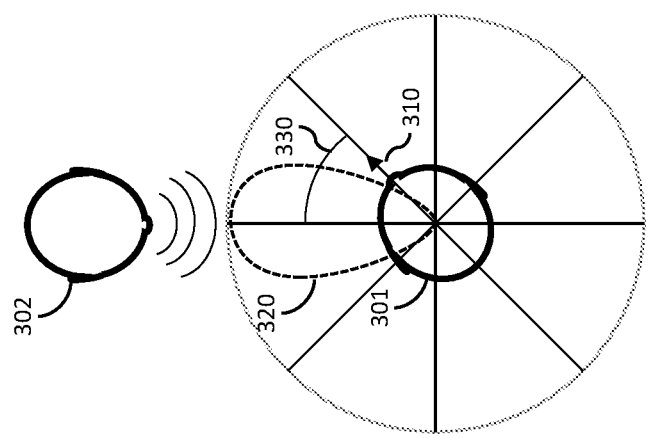
FIG. 3B is a possible polar plot of a sensitivity of a head-worn microphone array having a beam steered in a second direction when a head of a user is in a second position.
Figure 3A:
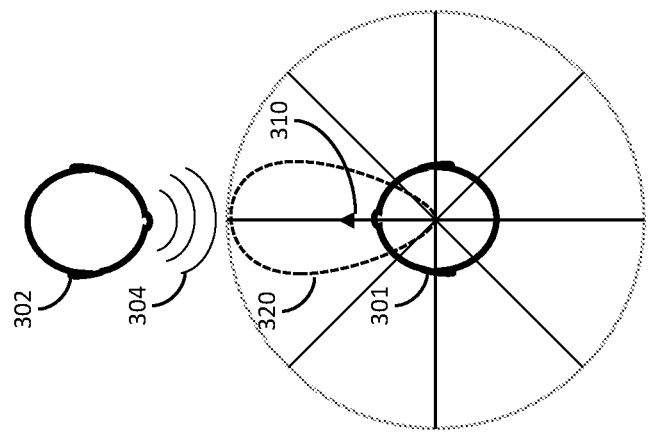
FIG. 3A is a possible polar plot of a sensitivity of a head-worn microphone array having a beam steered in a first direction when a head of a user is in a first position.

FIG. 3A and FIG. 3B illustrate beamforming as described above. In FIG. 3A the microphone array of a head-worn computing device worn on the head of the user 301 may be beamformed (i.e., focused) towards a first speaker 302 (e.g., in conversation with the user 301). Here, the head of the user is in a first position and the beam 320 of the microphone array of the head-worn computing device is aligned with a sight-line direction 310 of a user. In FIG. 3B, the user's head is rotated by an angle 330 from the first position. The microphone array of the head-worn computing device is configured to adjust the beamforming to remain focused on the first speaker 302 despite the movement (i.e., yaw) of the user's head. In other words, when the head of the user is rotated by an angle 330 in a first direction (e.g., to the right), the head-worn computing device may be triggered to adjust the beamforming to rotate the beam 320 by the angle 330 in a second direction opposite to the first direction (e.g., to the left).

The head-worn computing device 200 can further include an ambient microphone 212 configured to capture a variety of sounds that may be excluded by the microphone array 210. For example, a directional sensitivity of the ambient microphone 212 may resemble the sensitivity shown in FIG. 1A, while a sensitivity of the microphone array 210 may resemble the sensitivity shown in FIG. 1B. The ambient microphone 212 may be useful for beamforming in response to a sound rather than a head movement. For example, beamforming may be applied in response to a change in speakers in a conversation. For example, at a first time, a first speaker can be recognized as speaking based on audio from the ambient microphone 212. Accordingly, the microphone array 210 may be focused (i.e., beamformed) towards the first speaker. Then, at a second time, a second speaker can be recognized as speaking based on audio from the ambient microphone 212. The second speaker may be recognized based on a quality (e.g., tone, pitch) of sounds from the second speaker. For this recognition, the quality can be compared to a quality stored in a participant list associated with participants of a conversation. After the second speaker is recognized, the microphone array 210 may be focused (i.e., beamformed) towards the second speaker. The focusing may include focusing towards a direction of the second speaker stored in a conversation layout. Alternatively, the focusing may include adjusting the relative phases of the microphones in the microphone array to scan a beam of the microphone array until received sounds with qualities matching the second speaker are maximized. Thus, the beamforming may be applied without a head movement.

FIG. 3A and FIG. 3C illustrate beamforming as described above. In FIG. 3A the microphone array of a head-worn computing device worn may be beamformed (i.e., focused) towards a first speaker 302 (e.g., in conversation with the user 301) to capture first-speaker audio 304 with high directional sensitivity. As shown in FIG. 3C, the ambient microphone of the head-worn computing device has an isotropic sensitivity 340. When the ambient microphone 212 captures second-speaker audio 305 from a second speaker 303, the head-worn computing device may be triggered to adjust beamforming to rotate (i.e., focus) the beam 320 of the microphone array towards the second speaker 303, as described above, in order to capture the second-speaker audio 305 with high sensitivity. Generally, the direction of beam may be updated upon detecting a target change (e.g., speaker change) based on sounds (e.g., speech) received by the omnidirectional microphone. For example, speakers in a conversation may each have a corresponding direction stored in a conversation layout. Audio from the omni directional microphone (i.e., unfocused audio) may be processed (e.g., using voice recognition) to determine an active speaker. The conversation layout may then be addressed with the active speaker to determine a direction to focus the beam of the microphone array. The examples shown in FIGS. 3A-3C are not limiting. For example, the number of speakers is not limited to two, and, in some implementations, a microphone array may be configured to focus multiple beams at multiple speakers.

The head-worn computing device 200 may further include a plurality of loudspeakers. In a possible implementation the plurality of loudspeakers include a left loudspeaker (or left loudspeakers) configured to transmit audio to a left ear of a user and a right loudspeaker (or right loudspeakers) configured to transmit audio to a right ear of the user. The loudspeakers may be integrated within the frame of the head-worn computing device 200. For example, a left loudspeaker 231 may be integrated in a left-arm of the head-worn computing device and a right loudspeaker 230 may be integrated with the right-arm of the head-worn computing device. In possible implementations, the head-worn computing device may include a left earbud 234 and a right earbud 233. The left earbud 234 and the right earbud 233 may be communicatively coupled to processing in the head-worn computing device via a wired or wireless communication link 232 (e.g., BLUETOOTH, WiFi, etc.). The earbuds may be worn in the respective ears of a user. The earbuds can be configured to play audio received by the microphone array 210. The audio played by the earbuds may be beamformed audio that results from a beamforming (i.e., beam steering, focusing) process, such as described in conjunction with FIG. 1B.

A sensitivity of the microphone array 210 may be focused in a first direction towards a target (e.g., a person). If an orientation of the microphone array (i.e., the head-worn computing device 200) changes, the sensitivity of the microphone array 210 may be focused in a second direction, relative to the frame of reference of the head-worn display that changes with the orientation of the microphone array, towards the target, where the second direction corresponds to the change in the orientation. In other words, when a user wears the head-worn computing device, the focus of the microphone array may be maintained on the target even as the head of the user moves. The movement can include changes in orientation and/or translations in position of the head of the user.

The first direction and the second direction may be determined using a variety of sensors on the head-mounted computing device. The first direction may be established using a first sensor, while the second direction may be determined using a second sensor. For example, a camera may capture images/video that are analyzed to determine the target (e.g., a person) and the first direction towards the target. After the first direction is established, the second direction may be determined as a change from the first direction. Computing this change from the first direction can be achieved using a sensor with reduced processing requirements. For example, the head worn computing device may include an IMU to measure changes in orientation to determine the second direction relative to the first direction. Because the IMU may be able to respond to changes quickly, with fewer processing requirements than are needed to perform computer vision techniques, it may provide faster tracking rates, which can be useful for some beamforming applications (e.g., bystander privacy). For applications that require slower tracking rates, changes in position may also be obtained using images, depth data, and/or position data (e.g., GPS data) captured by sensors in the head-worn computing device.

The IMU can be configured to determine (and track) an orientation of the microphone array 210. For example, data from the camera and/or the IMU may help to define an initial orientation of a frame of reference 250 of the head-worn computing device 200, relative to a reference frame that is fixed in space. Thereafter, data from the IMU may help detect change of orientation of the frame of reference 250 of the head-worn computing device 200 from the initial orientation and to quantify the change or orientation. In other words, the IMU may help detect movement of a head wearing the head-worn computing device 200, quantify the movement of the head, and establish a new head orientation after a movement.

The IMU of the head-worn computing device 200 may include a multi-axis accelerometer, a gyroscope, and/or a magnetometer. The IMU may be preferable for applications that require high tracking rates and/or lower processing requirements. For example, a head-mounted computing device operating via a battery may have limited power resources. An IMU may continuously measure orientation without consuming large amounts of power. Additionally, reading the data from the IMU may be accomplished using a relatively simple controller. Accordingly, the IMU may be able to help continuously track orientation of the microphone array 210 at very high rates without straining the limited processing/power resources of the head-mounted computing device. This power/processing efficient continuous tracking may be useful for responding quickly to head movements.

The determination of the orientation may use alternate or additional sensors of the head-worn computing device 200. For example, the head-worn computing device may include a depth camera (using, for example, structured light, LIDAR) to optically sense movement of the head-worn computing device 200, which corresponds to movement of the microphone array 210.

Figure 4:
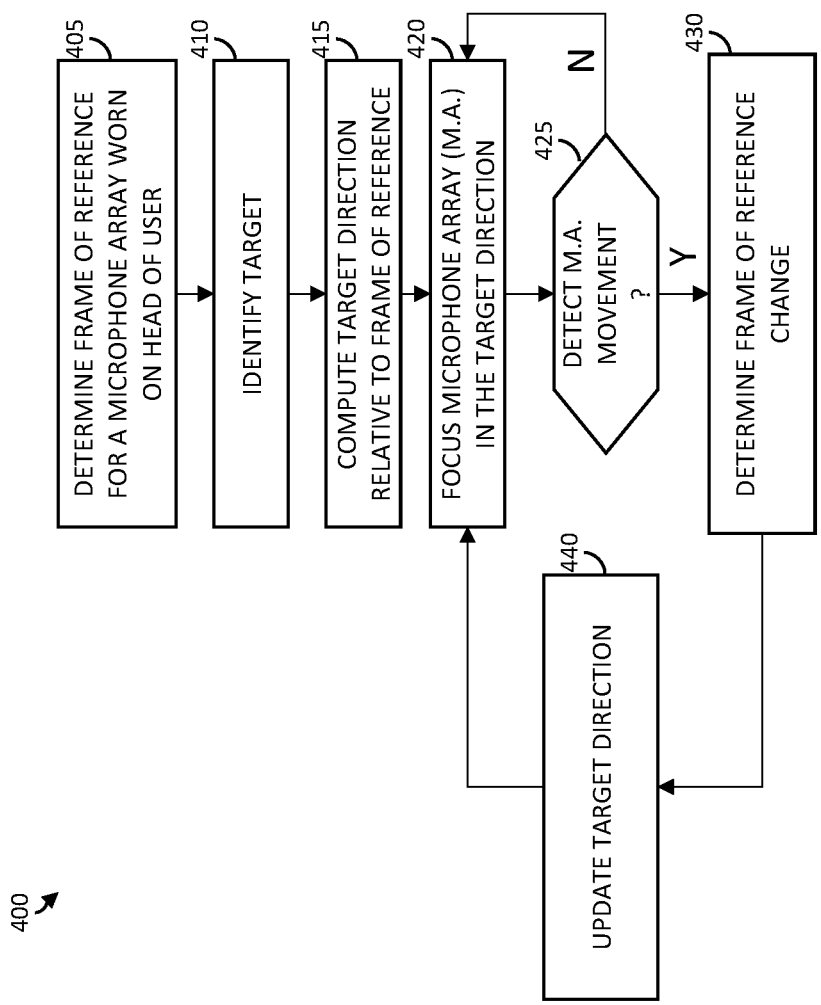
FIG. 4 is a flowchart of a possible method for focusing a microphone array of the head-worn computing device of FIG. 2 on a target.

FIG. 4 is a flowchart of a method for focusing a microphone array of the head-worn computing device on a target according to a possible implementation of the disclosure. The method 400 includes determining 405 an orientation of a frame of reference for a microphone array that is worn on the head of a user. The microphone array may be included as part of a head-worn computing device, such as shown in FIG. 2, but may also be part of a system. For example, the microphone array may be part of a system in which components for focusing the microphone array are physically separate but are communicatively coupled (e.g., wirelessly). The orientation of the frame of reference of the microphone array may be determined by one or more sensors, such as an IMU. The frame of reference of the microphone array may, or may not, be aligned with a point of view of the user.

The method 400 further includes identifying 410 a target. The target may be a sound source, such as a person or an object (e.g., television, radio, speaker, etc.). Identifying the target may include designating a position or direction of the target relative to the frame of reference. The step of identifying may be automatic or may be manual. In one possible implementation, a point of view of the user may be positioned on a target to identify (e.g., acquire) the target. For example, a user may position a target in the user's field of view and then trigger the head-worn computing device to identify the target using keywords (e.g., "lock on speaker", "switch speaker") spoken by the user and recognized by the head-worn computing device. Alternatively, a user may position a target in the user's field of view and the trigger the head-worn computing device to identify the target by physically interacting with the head-worn computing device (e.g., pressing a button, tapping the device, etc.). In automatic target recognition, sounds from the microphones of the head-worn computing device and/or images from the camera of the head-worn computing device may be monitored to identify targets. For example, the sounds and images may be processed using computer recognition algorithms to identify speech patterns (pauses, changes in speakers, etc.) and visual cues (e.g., eye contact) indicating a conversation with a target. In another possible implementation, a particular sound may be recognized to identify the target.

Once a target is identified, the method can include determining 415 a target direction relative to the frame of reference. In one possible implementation, the target direction may be determined using light. For example, imaging sensing and computer vision algorithms can be configured to determine a direction of the target (e.g., relative to a point of view of the user) based on still and/or video images captured by one or more cameras 201 of the head-worn computing device. In another possible implementation, the target direction may be determined using sound. For example, sound sensing and computing hearing algorithms can be configured to determine a direction of the target based on sounds emitted by the target, as described above.

Once the initial frame of reference of the head-worn computing device 200 and the target are acquired and spatially determined, the method may include focusing 420 the microphone array in the target direction (e.g., on the target). The focusing may be performed by processing audio signals received by each microphone in the microphone array so that a sensitivity of the microphone array is higher (e.g., highest) in the target direction of the frame of reference of the head-worn computing device 200, as compared with other directions. In other words, the focusing may result from signal processing rather than a physical change to the system.

The microphone array can remain focused in the target direction until a movement of the microphone array is detected (e.g., using the IMU). When a movement of the microphone array is detected 425, the method can include determining 430 a change to an orientation of the frame of reference relative to a fixed frame of reference in space and/or relative to an initial frame of reference of the head-worn computing device. For example, an angle (or angles) of a new orientation of the frame of reference relative to the initially-determined orientation of the frame of reference may be determined. The change to orientation of the frame of reference may be used to update 440 the target direction. After the target direction is updated, the beamformed sensitivity of microphone array may be re-directed in the updated target direction where it remains until another movement is detected. The redirecting of the beamformed sensitivity of the microphone array in the updated target direction can include reducing a sensitivity of the microphone array in directions other than in the updated target direction. This process may be repeated to maintain focus of the microphone array of the head-worn computing device on the target. Determining 430 the frame of reference change and the updating 440 of the target direction may be repeated at a first rate that is fast enough to accommodate a user's natural movement of the head so that the user's movement is not constrained. Identifying 410 a target and computing 415 a target direction may also be repeated, but at a second rate that can be slower than the first rate, because targets may be added or removed in a time scale that is long compared to head movements. Accordingly, an approach of determining the an initial frame of reference orientation with respect to a target and then tracking changes in the orientation from the initial orientation may use fewer resources, and may be used favorably in a in a process/power limited application, such as a battery operated head-worn computing device, than an approach of continuously identifying the target and computing the target's direction. For example, a processor may be configured to perform computer vision algorithms to initially detect a target, and once a target direction is determined with respect to an initial orientation of a frame of reference, then continuously update the target direction based on changes to the frame of reference. The method shown in FIG. 4 can be applied to various head-worn microphone arrays, various targets, and various means for identifying the target. A more particular implementation is illustrated in FIG. 5.

Figure 5:
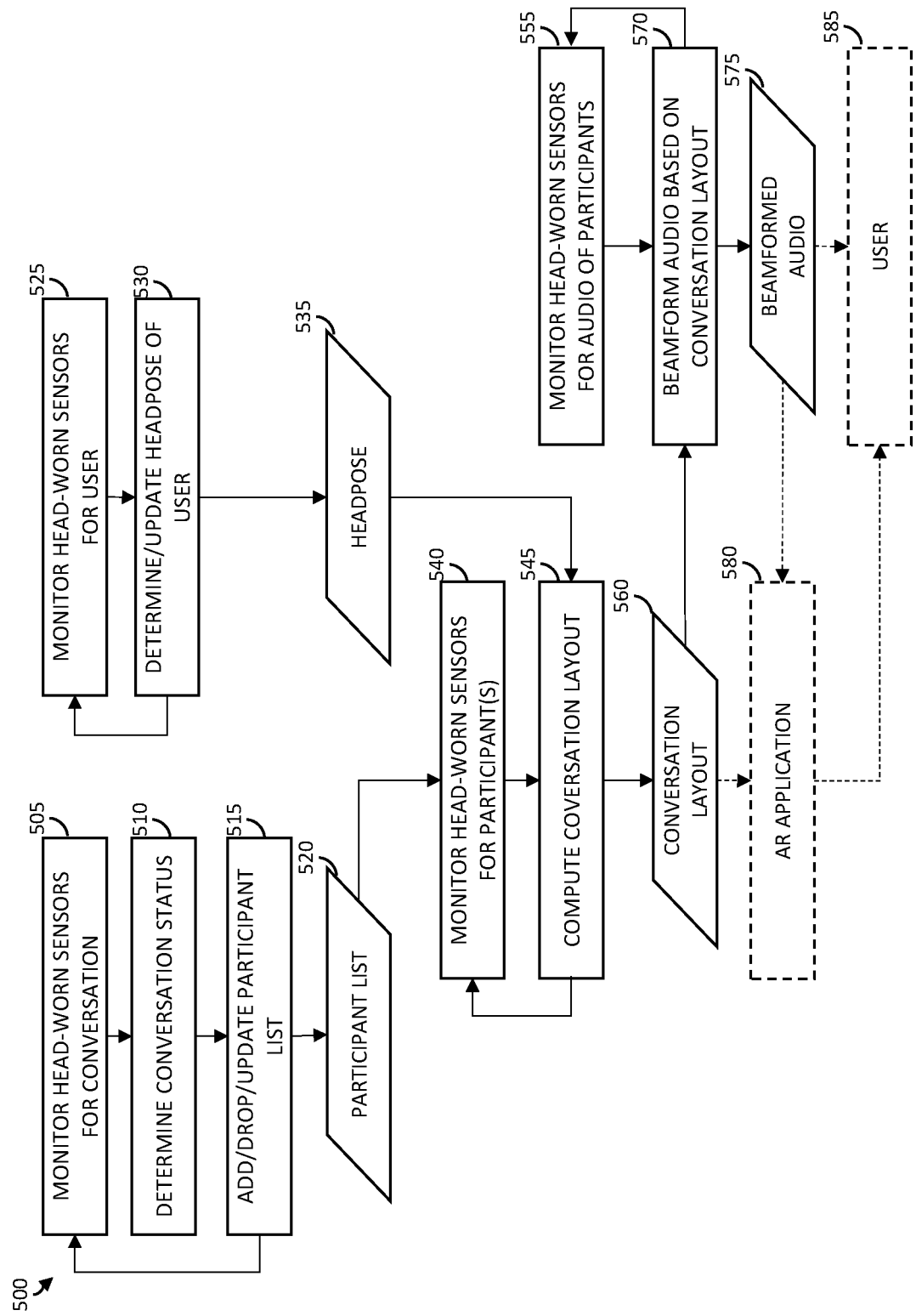
FIG. 5 is a flowchart of a method for generating beamformed audio based on a conversation layout according to a possible implementation of the present disclosure.

FIG. 5 is a flowchart for a method for generating beamformed audio based on a conversation. The method can be implemented to provide a level of bystander security to any conversation enhancements provided by the head-worn computing device. For example, the beamforming may prevent a user from eavesdropping and/or inadvertently hearing bystanders. The method can also be implemented to aid a user in understanding the conversation. The method can also be used to aid an application (e.g., running on the head-worn computing device) to accurately recognizing words in the conversation. Accordingly, the beamformed audio may also be used in AR applications running on the head-worn computing device of FIG. 2, which can be configured for AR (e.g., smart glasses). It is in this context that the method of FIG. 5 is discussed.

The method 500 includes monitoring head-worn sensors for a user. In particular, an IMU in the head-worn computing device 200 can be monitored 525 and used to determine 530 an orientation/position (i.e., head-pose 535) of a head of a user wearing the head-worn computing device 200. For example, a head-pose 535 of a user may include a frame of reference 250 aligned with a microphone array 210. The head-pose 535 may be repeatedly updated as the user wears the head-worn computing device 200 so that changes in the head-pose can trigger changes in the beamforming.

The method 500 also includes monitoring head-worn sensors for a conversation. For example, one or more cameras 201 may monitor 505 (i.e., capture) video/images that can be applied to computer-vision algorithms configured to detect a conversation based on visual characteristics (e.g., eye contact, lip movement, etc.) associated with a conversation between a conversation participant (i.e., participant) and the user. Likewise, an ambient microphone 212 may monitor 505 (i.e., capture) audio that can be applied to voice/speech recognition algorithms configured to recognize a conversation based on audio characteristics (e.g., speech-to-text, pauses, transcripts, etc.) associated with a conversation between the participant and the user. In a possible implementation, both the visual characteristics and the audio characteristics can be monitored 505 to detect a conversation. After the conversation is detected, the head-worn sensors may be monitored to determine 510 a status (i.e., active, inactive) of the conversation between the participant and the user. For example, if no audio or visual characteristics are detected for a period, then the conversation may be determined as inactive (i.e., over, ended).

The conversation may include more than one participant. Accordingly, the method 500 can further include adding, dropping, or otherwise updating 515 a participant list 520 corresponding to the detected conversation. For example, a conversation may be detected between the user and a first participant at a first time. At the first time, the participant list includes one conversation (i.e., the first participant). At a second time, a second participant may join the conversation or start a new conversation. At the second time, the second participant may be added to the participant list so that the participant list includes the first participant and the second participant. At a third time, after a period of conversation inactivity by the second participant, the second participant is dropped (i.e., removed, deleted) from the participant list 520 so that only the first participant remains. At a fourth time, after a period of conversation inactivity by the first participant, the first participant can be dropped from the list so that the participant list is empty. The participant list can automatically change based on the user's interaction with people. The participant list may include a variety of information associated with a participant. For example, an identifier of the participant and a status of the conversation between the participant and the user may be included in the participant list 520. Additionally, the participant list 520 may include features (e.g., visual, auditory) of each participant. In this way conversations may be more easily recognized when a former participant reappears.

Based on the participant list, the method further includes monitoring 540 head-worn sensors (e.g., camera, microphone) of the head-worn computing device 200 to determine positions of each participant on the participant list 520 relative to the head-pose 535 of the user. Based on the relative positions of the user and the participants, a conversation layout 560 can be computed 545 (or updated). The conversation layout 560 may include participants and directions relative to the user, such as shown in FIG. 3C. The microphone array 210 of the head-worn computing device 200 may then monitor 555 (i.e., capture) and process audio from the microphone array 210 according to beamforming algorithms in order to generate beamformed audio 575. For example, the captured audio may be processed (filtered, delayed, phase shifted) according to the conversation layout to beamform 570 the microphone array to each participant, either simultaneously or in sequence.

The beamformed audio 575 may be updated automatically and in real time as the conversation layout 560, which is based on the participant list 520 and the head-pose 535 of the user, changes. The beamformed audio 575 may be provided to a user 585, via loudspeakers (e.g., in ears of a user) to help the user hear the audio from the participants in the conversation regardless of how the conversation layout (e.g., head-pose) changes. The beamformed audio 575 may also be provided to an AR application 580. The AR application may modify or transform the beamformed audio 575 into an output that can be experienced by a user. For example, the AR application may process the beamformed audio to generate captions (e.g., text-to-speech, translation), which can be displayed to the user in the display area 220. The beamformed audio may have a technical effect of providing privacy by preventing or hindering the user from receiving audio from bystanders to a detected conversation.

Figure 6:
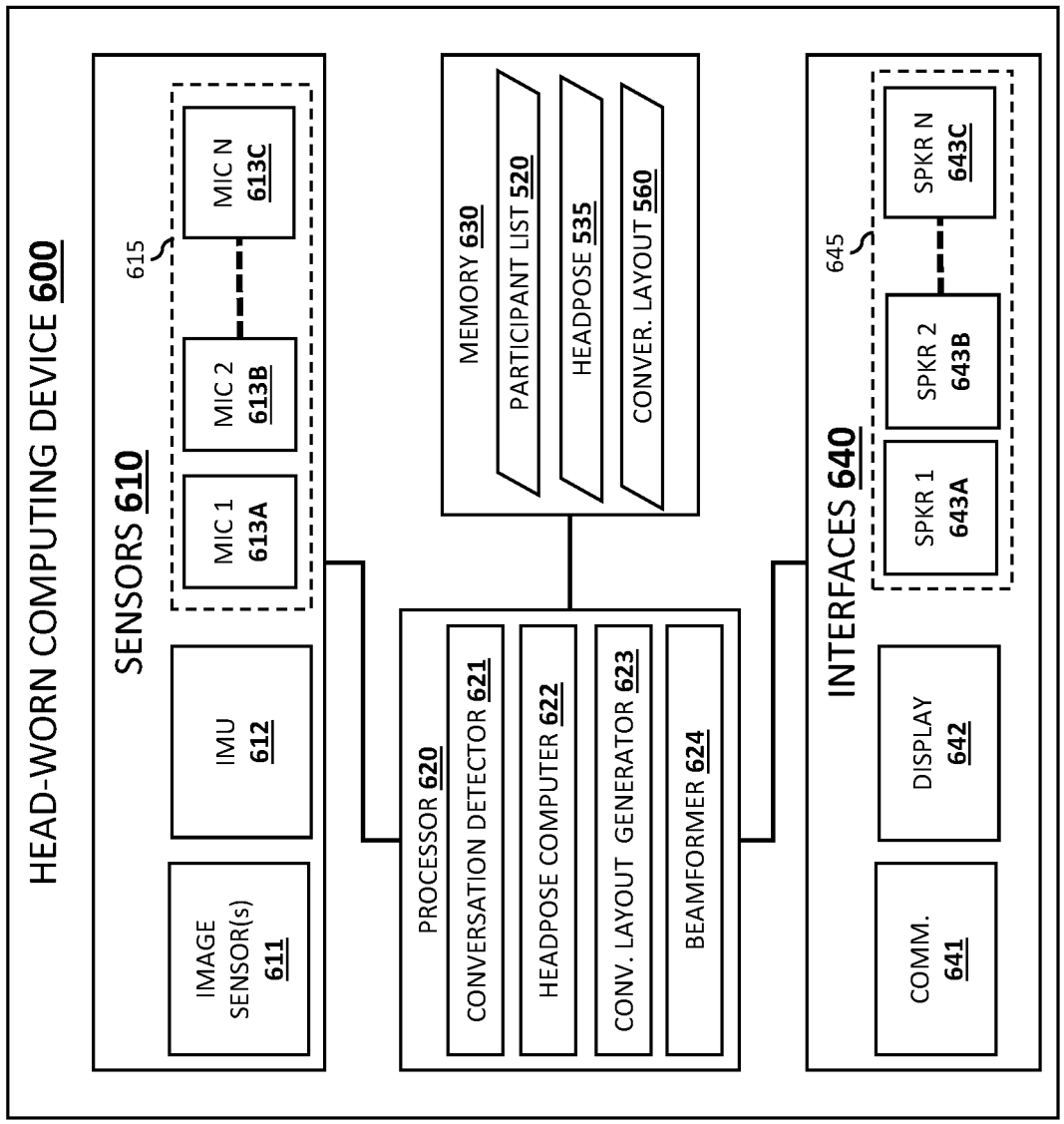
FIG. 6 is a block diagram of a head-worn computing device configured for generating beamformed audio based on a conversation layout according to a possible implementation of the present disclosure.

FIG. 6 is a block diagram of a head-worn computing device configured for generating beamformed audio based on a conversation layout according to a possible implementation of the present disclosure. The head-worn computing device 600 can include a plurality of sensors 610. The sensors 610 may include one or more image sensors 611 (e.g., cameras) configured to capture images/video of a field of view. The sensors 610 may further include an IMU 612 configured to measure an orientation and/or a movement of the head-worn computing device. The sensors 610 may further include a microphone array 615, which may include a plurality of microphones 613A, 613B, 613C.

The head-worn computing device 600 may further include a plurality of interfaces 640. The interfaces 640 can include a communication interface 641 configured to transmit/receive data to/from the head-worn computing device 600. For example, the communication interface 641 may include a short-range wireless communication transceiver (e.g., BLUETOOTH). In a possible implementation, the communication interface 641 is coupled to hearing instruments (e.g., hearing aids, earbuds, etc.) worn by a user. The interfaces 640 may include a display 642 configured to present images, graphics, and/or text to a user. The interfaces may further include one or more loudspeakers 643A, 643B, 643C. The one or more loudspeakers may include a left loudspeaker and a right loudspeaker. In a possible implementation the loudspeakers may be included in a loudspeaker array 645.

The head-worn computing device 600 may further include a non-transitory computer-readable medium (i.e., memory 630). The memory 630 can store data and/or computer programs. These computer programs (also known as modules, programs, software, software applications or code) can include machine instructions for a programmable processor and can be implemented in a high-level procedural and/or object-oriented programming language, and/or in assembly/machine language. For example, the memory may include a computer program product tangibly embodied on the non-transitory computer-readable medium. The computer program product can include computer-executable instructions (i.e., software instructions) that, when executed, are configured to cause at least one processor 620 to perform the method for generating beamformed audio based on a conversation, such as shown in FIG. 5. Accordingly, the memory 630 may be further configured to store the (latest) participant list 520, head-pose 535, and conversation layout 560.

The head-worn computing device 600 may further include at least one processor 620. The at least one processor 620 can execute one or more modules to perform various aspects of the method for generating beamformed audio. The one or more modules can include a conversation detector 621 that is configured to receive measurements from the sensors 610 and based on the measurements, detect a conversation between a user and a participant. The results of the conversation detector may be stored in the participant list 520 in the memory 630. The one or more modules can further include a head-pose computer 622 that is configured to receive measurements from the sensors 610 and based on the measurements, compute an orientation of the head of a user (i.e., the orientation of the microphone array 615). The results of the head-pose computer 622 may be stored as the head-pose 535 in the memory 630. The one or more modules can further include a conversation layout generator 623 that is configured to generate a layout (i.e., map) of a conversation based on the participant list 520 and the head-pose 535. The results of the head-pose computer 622 may be stored as the conversation layout 560 in the memory 630. The one or more modules can further include a beamformer 624 that is configured to receive audio signals (i.e., channels) from each microphone (or a portion of the microphones) in the microphone array 615 and to processes the audio signals to generate beamformed audio (e.g., a beamformed audio signal). The beamformed audio may be communicated to the interfaces 640, or in some implementations, can be communicated to the user.

In the specification and/or figures, typical embodiments have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

It will be understood that, in the foregoing description, when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application, if any, may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

The invention claimed is:

1. A head-worn computing device, comprising:
   a microphone array including a plurality of microphones configured to generate beamformed audio according to a beamformed sensitivity,
   an omni directional microphone configured to generate unfocused audio;
   a plurality of sensors configured to detect a first speaker and a second speaker; and
   a processor coupled to the microphone array, the omni directional microphone, and the plurality of sensors, the processor configured by software instructions to:
   direct the beamformed sensitivity of the microphone array in a first direction towards the first speaker;
   detect a speaker change based on the unfocused audio; and
   redirect the beamformed sensitivity of the microphone array in a second direction towards the second speaker based on the speaker change.

2. The head-worn computing device according to claim 1, wherein redirecting the beamformed sensitivity of the microphone array in the second direction includes reducing the beamformed sensitivity of the microphone array in the first direction.

3. The head-worn computing device according to claim 1, wherein the processor is further configured to delay channels of audio from the microphone array relative to each other in order to direct and redirect the beamformed sensitivity of the microphone array.

4. The head-worn computing device according to claim 1, wherein the plurality of microphones includes an omnidirectional microphone configured to generate the unfocused audio based on sounds received according to an isotropic sensitivity of the omnidirectional microphone.

5. The head-worn computing device according to claim 4, wherein the processor is further configured to:
   identify the first speaker and the second speaker based on the unfocused audio received by the omnidirectional microphone.

6. The head-worn computing device according to claim 1, wherein the plurality of sensors includes a camera configured to capture video from a point of view of a user wearing the head-worn computing device, and wherein the processor is further configured to identify the first direction towards the first speaker and the second direction towards the second speaker.

7. The head-worn computing device according to claim 1, wherein the plurality of sensors includes an inertial measurement unit configured to measure an orientation of the head-worn computing device.

8. The head-worn computing device according to claim 7, wherein the inertial measurement unit is configured to sense a change in the orientation and the processor is configured to obtain an updated second direction towards the second speaker based on the change.

9. The head-worn computing device according to claim 1, wherein the processor is further configured to generate the beamformed audio based on the beamformed sensitivity of the microphone array and to transmit the beamformed audio to an augmented reality application running on the head-worn computing device.

10. The head-worn computing device according to claim 1, wherein the processor is configured to generate the beamformed audio based on the beamformed sensitivity of the microphone array and to transmit the beamformed audio to a plurality of loudspeakers.

11. The head-worn computing device according to claim 10, wherein the plurality of loudspeakers includes one or more hearing instruments configured to be worn in an ear, or ears, of a user.

12. The head-worn computing device according to claim 11, wherein the one or more hearing instruments are configured to communicate wirelessly with the processor.

13. A method for generating beamformed audio based on a conversation layout comprising:
  detecting a conversation between a user, a first speaker, and a second speaker based on images or video captured by a camera of a head-worn computing device worn by the user;
  determining a head-pose of the user based on measurements captured by sensors of the head-worn computing device worn by the user;
  computing the conversation layout based on relative positions of the first speaker, the second speaker, and the head-pose, the conversation layout including a first direction towards the first speaker and a second direction towards the second speaker;
  receiving unfocused audio from an omni directional microphone of the head-worn computing device;
  detecting a speaker change between the first speaker and the second speaker based on the unfocused audio;
  receiving channels of audio from a microphone array of the head-worn computing device; and
  processing the channels of the audio to shift the beamformed audio between the first direction and the second direction based on the speaker change and the conversation layout.

14. The method for generating the beamformed audio based on the conversation layout according to claim 13, wherein shifting the beamformed audio reduces a beamformed sensitivity directed at the first speaker.

15. The method for generating the beamformed audio based on the conversation layout according to claim 14, further including:
  obtaining an updated conversation layout, upon detecting a change in an orientation of the head-worn computing device using an inertial measurement unit; and
  processing the channels of the audio to redirect the beamformed sensitivity to the second speaker in the updated conversation layout.

16. The method for generating the beamformed audio based on the conversation layout according to claim 13, further including:
  presenting the beamformed audio to the user.

17. The method for generating the beamformed audio based on the conversation layout according to claim 13, further including:
  reducing a sensitivity of the beamformed audio in a direction towards a bystander.

18. The method for generating the beamformed audio based on the conversation layout according to claim 17, further including:
  presenting augmented reality visuals on a display of the head-worn computing device, the augmented reality visuals corresponding to the beamformed audio.

19. The method for generating the beamformed audio based on the conversation layout according to claim 18, wherein the augmented reality visuals are closed captions of the conversation.

20. A computer program product tangibly embodied on a non-transitory computer-readable medium and comprising instructions that, when executed, are configured to cause at least one processor of a head-worn computing device to:
  receive unfocused audio from an omnidirectional microphone of the head-worn computing device;
  identify a first speaker and a second speaker in the unfocused audio;
  sense a first direction to the first speaker and a second direction to the second speaker based on data from a plurality of sensors of the head-worn computing device;
  direct a beamformed sensitivity of a microphone array of the head-worn computing device in the first direction towards the first speaker;
  detect a speaker change based on the unfocused audio; and
  redirect the beamformed sensitivity of the microphone array in the second direction towards the second speaker based on the speaker change.

* * * * *